June 20, 1939. J. KOMOROUS 2,163,001
HAND MIRROR
Filed June 10, 1938
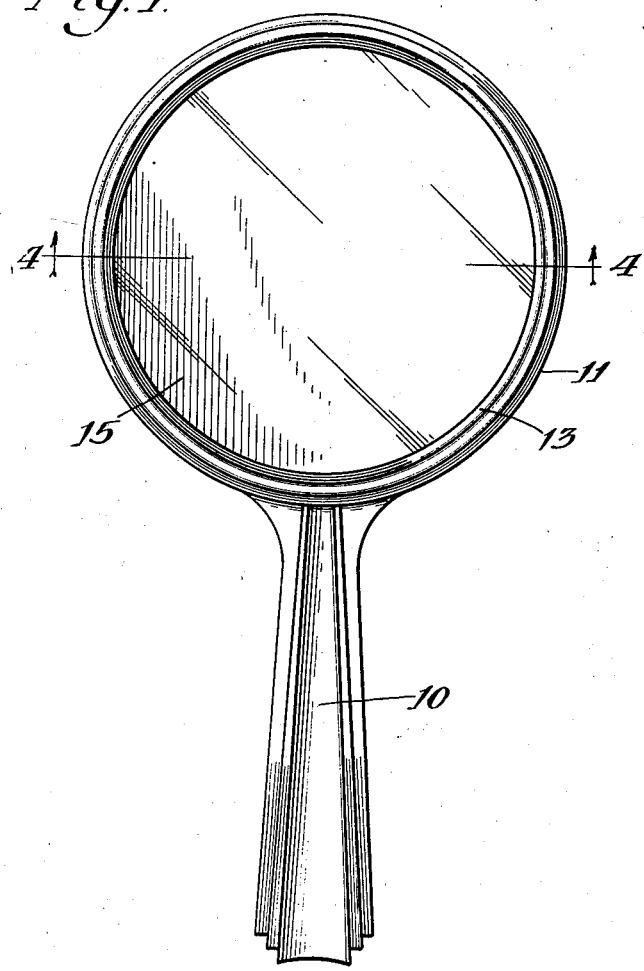
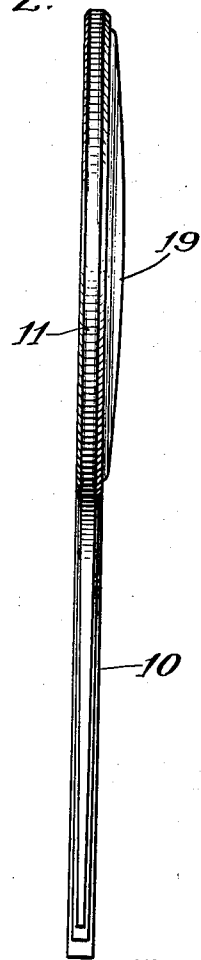
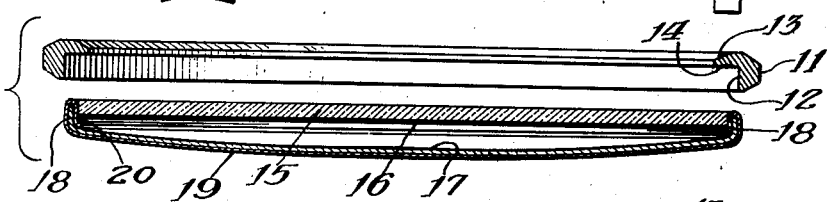
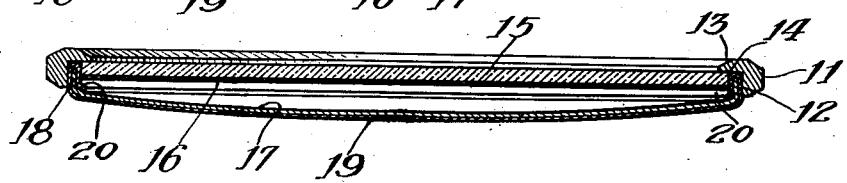
Inventor:
Joseph Komorous,
By: Bertha L. MacGregor
Attorney Patented June 20, 1939

2,163,001

UNITED STATES PATENT OFFICE 2,163,001

HAND MIRROR

Joseph Komorous, Riverside, Ill., assignor to Parisian Novelty Company, Chicago, Ill., a corporation of Illinois Application June 10, 1938, Serial No. 212,900

1 Claim. (Cl. 88—102)

This invention relates to hand mirrors. The main object of the invention is to produce a hand mirror which is very simple in construction, and the parts of which may be easily assembled.

The construction of my invention embodies two units. One unit consists of the mirror plate and a cover which extends over the coated back of the glass plate and engages the edges of the glass. The other unit consists of an integrally formed handle and open faced frame, the frame being adapted to receive and retain the previously assembled mirror glass and cover without the aid of an interlocking ring or other frame member.

By this construction, the handle and frame unit may be made of plastic material, molded or cast by any of the well known methods, and the two units comprising the hand mirror may be readily and economically assembled.

In the drawing:

Fig. 1 is a front elevation of a hand mirror embodying my invention.

Fig. 2 is a side elevation of the same.

Fig. 3 is a transverse sectional view, on an enlarged scale, showing the mirror and frame units in non-assembled relation.

Fig. 4 is a transverse sectional view, on an enlarged scale, taken on the line 4—4 of Fig. 1.

In that embodiment of the invention shown in the drawing, the frame unit consists of a handle 10 and open faced frame member in the form of an annular ring 11, having an inner concentric surface 12 which is parallel to the axis of the ring 11. Said ring 11 has a flange 13 on its front face which extends inwardly of the ring and has an inner surface 14 at right angles to the surface 12 of the ring 11. The frame unit may be made of molded or cast plastic material, and be given any desired contour and ornamentation.

The mirror unit comprises a plate of glass 15 coated in a familiar manner on its rear surface 16 which is protected by a cover preferably made of metal and consisting of the dished plate portion 17 and peripheral portion 18. The metal portions of the cover preferably are coated or covered by a flexible sheet, such as the Celluloid or paper and Celluloid sheet 19, having an edge portion 20 turned in over the peripheral portion 18 of the metal part of the cover. The sheet 19—20 may be crimped on the part 18 of the metal 17, and the mirror plate 15 is frictionally held within the cover parts, in engagement with the edge portion 20 of the flexible sheet, and flush with the bent portion of the sheet 19—20.

The assembled mirror plate and cover members 10 fit snugly within the frame or ring 11, in engagement with the concentric inner surface 12, and bearing on the shoulder formed by the inner surface 14 of the flange 13 which overlies the face of the mirror unit adjacent its periphery. Adhesive or cementing means may be provided between the frame surfaces 12, 14 and that part of the cover 19 engaged thereby to rigidly connect the two units together.

The method of manufacturing the hand mirror herein described is very economical and has substantial advantages over prior art constructions.

Changes may be made in details of construction without departing from the scope of my invention.

I claim:

A hand mirror comprising an integral handle and open faced frame, said frame consisting of a ring of greater radial thickness at its front than at its rear, a mirror plate, and a cover extending over the rear surface of the mirror plate and engaging its edge, the cover consisting of a dished metal plate and a flexible sheet adjacent the outer surface of the metal and turned inwardly over the edge of the metal between the metal and the mirror plate, the cover edge being flush with the face of the mirror plate, said assembled mirror plate and cover having a snug fit within the thinner portion of the ring, the mirror plate and flush edge of the cover being parallel to and bearing against the rear surface of the thicker portion of said ring, the outer convex surface of the cover projecting outwardly beyond the rear of the frame.

JOSEPH KOMOROUS.